US012633541B2

(12) United States Patent
Yoshida et al.

(10) Patent No.: US 12,633,541 B2
(45) Date of Patent: May 19, 2026

(54) LITHIUM-CONTAINING OXIDE PRECURSOR SOLUTION FOR COATING ELECTRODE ACTIVE MATERIAL, AND METHOD FOR PRODUCING THE SAME

(71) Applicants: DOWA ELECTRONICS MATERIALS CO., LTD., Tokyo (JP); TOYOTA JIDOSHA KABUSHIKI KAISHA, Aichi-ken (JP)

(72) Inventors: Masahiro Yoshida, Tokyo (JP); Hidefumi Fujita, Tokyo (JP); Koji Tanoue, Tokyo (JP); Kazuki Muraishi, Tokyo (JP); Masaru Kubota, Tokyo (JP); Yuki Ishigaki, Tokyo (JP)

(73) Assignees: DOWA ELECTRONICS MATERIALS CO., LTD., Tokyo (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 821 days.

(21) Appl. No.: 17/878,460

(22) Filed: Aug. 1, 2022

(65) Prior Publication Data

US 2023/0051009 A1      Feb. 16, 2023

(30) Foreign Application Priority Data

Aug. 2, 2021   (JP) ................................ 2021-126976
Jul. 1, 2022   (JP) ................................ 2022-107285

(51) Int. Cl.
*H01M 4/62*          (2006.01)
*H01M 4/36*          (2006.01)
        (Continued)

(52) U.S. Cl.
CPC ............. *H01M 4/62* (2013.01); *H01M 4/366* (2013.01); *H01M 4/505* (2013.01); *H01M 4/525* (2013.01); *H01M 2004/028* (2013.01)

(58) Field of Classification Search
None
See application file for complete search history.

(56) References Cited

U.S. PATENT DOCUMENTS

2016/0028076 A1    1/2016  Lee et al.
2016/0211519 A1    7/2016  Uchiyama et al.
                   (Continued)

FOREIGN PATENT DOCUMENTS

CN        105122521 A      12/2015
CN        106848213 A       6/2017
                   (Continued)

OTHER PUBLICATIONS

Porcher et al., Optimizing the surfactant for the aqueous processing of LiFePO4 composite electrodes, Journal of Power Sources, 2010 (Year: 2010).*
                   (Continued)

*Primary Examiner* — Keling Zhang
(74) *Attorney, Agent, or Firm* — Greenblum & Bernstein, P.L.C.

(57)          ABSTRACT

A lithium-containing oxide precursor solution for coating an electrode active material that includes Li in an amount of 0.1 mass % or more and 5.0 mass % or less, at least one element selected from Nb, F, Fe, P, Ta, V, Ge, B, Al, Ti, Si, W, Zr, Mo, S, Cl, Br, and I in an amount of 0.05 mass % or more and 35 mass % or less, and water in an amount of 60 mass % or more and 98.4 mass % or less. The value of absorbance of the solution at a wavelength of 660 nm is 0.1 or less, and the value of surface energy thereof is 72 mN/m or less.

10 Claims, 2 Drawing Sheets

(51) Int. Cl.
  *H01M 4/505* (2010.01)
  *H01M 4/525* (2010.01)
  *H01M 4/02* (2006.01)

(56) References Cited

U.S. PATENT DOCUMENTS

| | | |
|---|---|---|
| 2017/0077489 A1 | 3/2017 | Uchiyama |
| 2017/0162856 A1 | 6/2017 | Uchiyama |
| 2017/0214039 A1 | 7/2017 | Liu et al. |
| 2019/0074512 A1 | 3/2019 | Choi et al. |
| 2019/0097216 A1 | 3/2019 | Aiki et al. |
| 2019/0260068 A1 | 8/2019 | Yamamoto et al. |
| 2022/0109160 A1 | 4/2022 | Yoon et al. |

FOREIGN PATENT DOCUMENTS

| | | |
|---|---|---|
| CN | 108778999 A | 11/2018 |
| JP | 2013-089321 A | 5/2013 |
| JP | 2015-56307 A | 3/2015 |
| JP | 6034265 B2 | 11/2016 |
| JP | 2017-098196 A | 6/2017 |
| JP | 2018-60749 A | 4/2018 |
| JP | 2019-145261 A | 8/2019 |
| JP | 2022-061017 A | 4/2022 |
| WO | 2012/176903 A1 | 12/2012 |

OTHER PUBLICATIONS

Dow, Technical Data Sheet, TritonTM X-100 surfactant (Year: 2025).*
Araghi, Turbidity measured at 660 nm, Research Gate (Araghi), https://www.researchgate.net/post/Turbidity_measured_at_660_nm_albumin_denaturation (Year: 2022).*
Office Action that issued in U.S. Appl. No. 17/872,293, dated Mar. 18, 2025.
U.S. Appl. No. 17/872,293 to Muraishi et al., which was filed on Jul. 25, 2022.
Office Action that issued in U.S. Appl. No. 17/872,293, dated Aug. 13, 2025.
Office Action that issued in U.S. Appl. No. 17/872,293, dated Jan. 15, 2026.

* cited by examiner

LITHIUM-CONTAINING OXIDE PRECURSOR SOLUTION FOR COATING ELECTRODE ACTIVE MATERIAL, AND METHOD FOR PRODUCING THE SAME

BACKGROUND OF THE INVENTION

1. Field of the Invention

The present invention relates to a lithium-containing oxide precursor solution to be used to coat an electrode active material for use in a lithium secondary battery with a lithium-containing oxide, and a method for producing the lithium-containing oxide precursor solution.

2. Description of Related Art

Lithium secondary batteries are characterized by having a high energy density and being capable of operating at high voltage. Accordingly, lithium secondary batteries are used in information devices such as cellular phones as secondary batteries whose size and weight can be easily reduced. Also, in recent years, demand for lithium secondary batteries as high-power secondary batteries for hybrid cars and the like has also been on the rise.

For example, in lithium ion secondary batteries, a non-aqueous solvent electrolyte obtained by dissolving a salt in an organic solvent is typically used as an electrolyte. However, the non-aqueous solvent electrolyte is flammable, and therefore, there is a need to solve the safety issue of the lithium ion secondary batteries. For example, a safety device is incorporated into the lithium ion secondary batteries as a measure to ensure the safety. Also, a method of producing all-solid-state lithium batteries by using a nonflammable electrolyte instead of the above-described electrolyte, that is, using a solid electrolyte as a lithium ion conductor, has been proposed as a more drastic solution.

The battery electrode reaction typically occurs at the interface between the electrode active material and the electrolyte. Note that the concept of the electrode active material in the present invention encompasses a positive electrode active material and a negative electrode active material.

Here, when a liquid electrolyte is used as the electrolyte, an electrode containing an electrode active material is immersed in the liquid electrolyte, and thus the liquid electrolyte infiltrates between active material particles and the reaction interface is formed. On the other hand, when a solid electrolyte is used as the electrolyte, there is no mechanism for a solid electrolyte in which the electrolyte infiltrates between active material particles as described above, and therefore, it is necessary to mix powder containing the electrode active material particles and powder of the solid electrolyte beforehand. Accordingly, an electrode for an all-solid-state lithium battery is generally made of a mixture of powder of an electrode active material and a solid electrolyte.

However, in the all-solid-state lithium battery, a high-resistance site is formed at the interface between the electrode active material and the solid electrolyte, and thus the interface resistance is likely to increase. In order to avoid such a situation, a method may be employed in which the interface resistance is reduced by coating the surface of the electrode active material with a lithium-containing oxide. For example, JP 2015-56307A and JP 2019-145261A propose a technique in which a lithium niobate (which is a lithium-containing oxide) precursor solution is applied to the surface of powder of the electrode active material and is dried to form a lithium niobate coating layer on the powder surface.

JP 2015-56307A and JP 2019-145261A are examples of related art.

However, studies conducted by the inventors of the present invention showed that, when a lithium niobate precursor solution according to the related art was used to form a coating layer on the surface of powder obtained from the electrode active material particles, there were cases where the coverage of the coating layer was insufficient. Thus, a problem was found in that the formation of a high-resistance site progressed from a portion of the electrode active material that was insufficiently coated with the coating layer, resulting in deterioration of the battery characteristics of the all-solid-state lithium battery.

On the other hand, there is market demand for a lithium-containing oxide precursor solution in which a solution composed mainly of water is used as a solvent in order to facilitate handling of the lithium-containing oxide precursor solution in a normal atmosphere.

SUMMARY OF THE INVENTION

The present invention was made under the above-described circumstances, and it is an object thereof to provide a lithium-containing oxide precursor solution for coating an electrode active material of a lithium secondary battery such as an all-solid-state lithium battery or a lithium ion secondary battery, the lithium-containing oxide precursor solution being capable of improving the coverage of a coating layer that is formed by applying the lithium-containing oxide precursor solution to the surface of powder of the electrode active material and drying it, and being easy to handle in a normal atmosphere because a solution composed mainly of water is used as a solvent.

As a result of extensive research conducted in order to achieve the above-described object, the inventors of the present invention devised a lithium-containing oxide precursor solution for coating an electrode active material that includes a predetermined amount of Li, a predetermined amount of at least one element (also referred to as an "element M" in the present invention) selected from Nb, F, Fe, P, Ta, V, Ge, B, Al, Ti, Si, W, Zr, Mo, S, Cl, Br, and I, and water in an amount of 60 mass % or more and 98.4 mass % or less, wherein the absorbance at a wavelength of 660 nm is 0.1 or less and the value of surface energy is 72 mN/m or less (although the concept of surface energy is the same as that of surface tension, the term "surface energy" is employed in the present invention).

Also, they found that, when the lithium-containing oxide precursor solution for coating an electrode active material was applied to the surface of powder of an electrode active material and was dried to form a coating layer, the coverage of the coating layer was improved, and the lithium-containing oxide precursor solution for coating an electrode active material was easy to handle in a normal atmosphere, and thus the present invention was accomplished.

That is to say, a first aspect of the invention for achieving the above-described object is a lithium-containing oxide precursor solution for coating an electrode active material, the solution including:

Li in an amount of 0.1 mass % or more and 5.0 mass % or less;

at least one element M selected from Nb, F, Fe, P, Ta, V, Ge, B, Al, Ti, Si, W, Zr, Mo, S, Cl, Br, and I in an amount of 0.05 mass % or more and 35 mass % or less; and water in an amount of 60 mass % or more and 98.4 mass % or less, wherein a value of absorbance at a wavelength of 660 nm is 0.1 or less, and a value of surface energy is 72 mN/m or less.

A second aspect of the invention is the lithium-containing oxide precursor solution for coating an electrode active material according to the first aspect of the invention, wherein a value of a polar component of the surface energy is 0 mN/m or more and 45 mN/m or less.

A third aspect of the invention is the lithium-containing oxide precursor solution for coating an electrode active material according to the first or second aspect of the invention, wherein a value of a molar ratio Li/M between the Li and the element M is 0.36 or more and 11.2 or less.

A fourth aspect of the invention is the lithium-containing oxide precursor solution for coating an electrode active material according to the first or second aspect of the invention, wherein a value of a molar ratio Li/Nb between the Li and the Nb is 0.90 or more and 1.40 or less.

A fifth aspect of the invention is the lithium-containing oxide precursor solution for coating an electrode active material according to the first or second aspect of the invention, wherein a value of a molar ratio Li/P between the Li and the P is 0.90 or more and 1.40 or less.

A sixth aspect of the invention is the lithium-containing oxide precursor solution for coating an electrode active material according to any one of the first to fifth aspects of the invention, wherein the value of surface energy is 15 mN/m or more and 40 mN/m or less.

A seventh aspect of the invention is the lithium-containing oxide precursor solution for coating an electrode active material according to any one of the first to sixth aspects of the invention, which contains a surfactant in an amount of 0.01 mass % or more and 20.0 mass % or less.

An eighth aspect of the invention is the lithium-containing oxide precursor solution for coating an electrode active material according to the seventh aspect of the invention, wherein the surfactant is a nonionic surfactant.

A ninth aspect of the invention is a method for producing a lithium-containing oxide precursor solution for coating an electrode active material, the method including:

a dissolving step of dissolving lithium and at least one element selected from Nb, F, Fe, P, Ta, V, Ge, B, Al, Ti, Si, W, Zr, Mo, S, Cl, Br, and 1 in a solvent composed mainly of water to be included in the lithium-containing oxide precursor solution for coating an electrode active material; and a surface energy adjusting step of adjusting a value of surface energy of the solvent composed mainly of water to be included in the lithium-containing oxide precursor solution for coating an electrode active material to 72 mN/m or less, wherein the dissolving step and the surface energy adjusting step are performed in any order.

A tenth aspect of the invention is a method for producing a lithium-containing oxide precursor solution for coating an electrode active material, the method including:

a dissolving step of dissolving lithium and at least one element selected from Nb, F, Fe, P, Ta, V, Ge, B, Al, Ti, Si, W, Zr, Mo, S, Cl, Br, and 1 in a solvent composed mainly of water to be included in the lithium-containing oxide precursor solution for coating an electrode active material;

a surface energy adjusting step of adjusting a value of surface energy of the solvent composed mainly of water to be included in the lithium-containing oxide precursor solution for coating an electrode active material to 72 mN/m or less; and a filtration step of filtering a solution obtained through the dissolving step, wherein the dissolving step and the surface energy adjusting step are performed in any order.

An eleventh aspect of the invention is the method for producing a lithium-containing oxide precursor solution for coating an electrode active material according to the ninth or tenth aspect of the invention, wherein a value of a polar component of the surface energy is adjusted to 0 mN/m or more and 45 mN/m or less in the surface energy adjusting step.

A twelfth aspect of the invention is the method for producing a lithium-containing oxide precursor solution for coating an electrode active material according to any one of the ninth to eleventh aspects of the invention, wherein the value of the surface energy is adjusted by adding a surfactant.

A thirteenth aspect of the invention is the method for producing a lithium-containing oxide precursor solution for coating an electrode active material according to the twelfth aspect of the invention, wherein the surfactant is a nonionic surfactant.

When the lithium-containing oxide precursor solution for coating an electrode active material according to the present invention is applied to the surface of powder of an electrode active material and is dried to form a coating layer, the coverage of the coating layer can be improved. The lithium-containing oxide precursor solution for coating an electrode active material according to the present invention is easy to handle in a normal atmosphere.

DETAILED DESCRIPTION OF THE INVENTION

Figure 1:
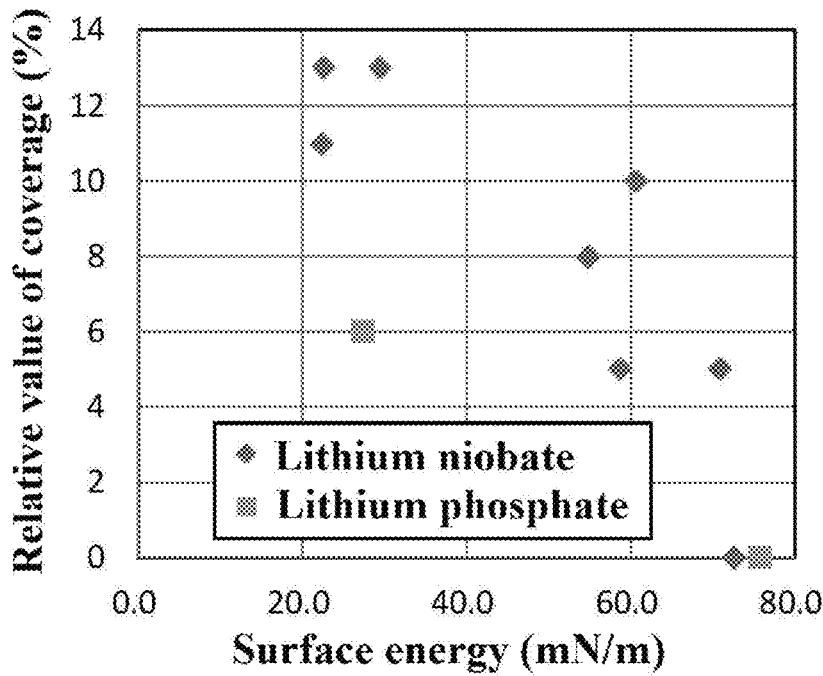
FIG. 1 is a graph showing the relationship between the value of surface energy and the coverage with respect to lithium-containing oxide precursor solutions for coating an electrode active material.

A lithium-containing oxide precursor solution for coating an electrode active material according to the present invention will be described in the following order: (1) Lithium- Containing Oxide Precursor Solution for Coating Electrode Active Material, and (2) Method for Producing Lithium-Containing Oxide Precursor Solution for Coating Electrode Active Material. Note that the concept of the electrode active material in the present invention encompasses a positive electrode active material and a negative electrode active material.

(1) Lithium-Containing Oxide Precursor Solution for Coating Electrode Active Material The precursor solution according to the present invention is a precursor solution that includes Li in an amount of 0.1 mass % or more and 5.0 mass % or less, at least one element selected from Nb, F, Fe, P, Ta, V, Ge, B, Al, Ti, Si, W, Zr, Mo, S, Cl, Br, and I in an amount of 0.05 mass % or more and 35 mass % or less, and water in an amount of 60 mass % or more and 98.4 mass % or less, wherein the value of absorbance at a wavelength of 660 nm is 0.1 or less and the value of surface energy is 72 mN/m or less.

The precursor solution according to the present invention contains Li at a concentration of 0.1 mass % or more and can thus be used as a precursor solution for a lithium-containing oxide coating layer.

On the other hand, the Li concentration is 5.0 mass % or less from the viewpoint of ensuring the solubility in a solvent contained in the precursor solution. However, the Li concentration is more preferably 1.0 mass % or less from the same viewpoint.

Note that the Li concentration in the precursor solution can be determined by analyzing the components of the precursor solution through, for example, inductively coupled plasma atomic emission spectroscopy.

The precursor solution according to the present invention includes, together with Li, at least one element M selected from Nb, F, Fe, P, Ta, V, Ge, B, Al, Ti, Si, W, Zr, Mo, S, Cl, Br, and I as an additive element, and can thus be used as a precursor solution for an oxide coating layer having lithium conductivity. In particular, Nb and P are preferred examples of the element M from the viewpoint of improving the voltage resistance of the coating layer. When the coating layer has high voltage resistance, the battery can operate at higher voltages, and, for example, the charging time can be reduced.

If the concentration of the element M in the precursor solution is less than 0.05 mass %, the Li concentration in the precursor solution will be excessive, and accordingly, lithium hydroxide with no lithium ion conductivity is highly likely to be generated and mixed in the coating layer during the formation of the coating layer. Therefore, the concentration of the element M in the precursor solution is preferably 0.05 mass % or more from the viewpoint of ensuring the lithium ion conductivity of a coating layer to be formed.

On the other hand, the concentration of the element M is 35 mass % or less from the viewpoint of ensuring the solubility in the solvent contained in the precursor solution. However, the concentration of the element M is more preferably 10 mass % or less from the same viewpoint.

Here, a plurality of elements M may be contained. In that case, the total concentration of the plurality of elements M is also preferably 0.05 mass % or more and 35 mass % or less, and more preferably 0.05 mass % or more and 10 mass % or less, for the above-mentioned reasons.

Note that the concentration of the element M in the precursor solution can be determined by analyzing the components of the precursor solution through, for example, inductively coupled plasma atomic emission spectroscopy.

In the precursor solution according to the present invention, the value of a molar ratio Li/M between Li and the element M is preferably 0.36 or more and 11.2 or less. The reason for this is that, when the value of Li/M is 0.36 or more, a sufficient amount of lithium is ensured in a lithium-containing oxide coating layer that is finally formed, and thus the lithium ion conductivity of the coating layer is ensured, which is preferable. Also, when the value of Li/M is 11.2 or less, lithium hydroxide or lithium nitrite with low lithium conductivity is not mixed in a lithium-containing oxide coating layer that is finally formed, and thus the lithium conductivity of the coating layer is ensured, which is preferable.

When Nb is used as the element M, the value of Li/Nb is preferably 0.90 or more and 1.40 or less for the above-described reasons from the viewpoint of ensuring the lithium ion conductivity of the coating layer.

When P is used as the element M, the value of Li/P is preferably 0.90 or more and 1.40 or less for the above-described reasons from the viewpoint of ensuring the lithium ion conductivity of the coating layer.

A solution composed mainly of water is used as the solvent of the precursor solution according to the present invention.

The precursor solution containing water in an amount of 60 mass % or more is stable in a normal atmosphere. As a result, the operation of coating the electrode active material with the precursor solution can easily be performed in a normal atmosphere. On the other hand, when the water content is 98.4 mass % or less, it is possible to avoid an increase in the amount of the precursor solution used to obtain a coating layer having a predetermined film thickness, the increase resulting from the low concentrations of Li and the element M in the precursor solution.

Note that it is convenient to measure the water content in the precursor solution through volumetric titration using a Karl Fischer moisture meter.

The value of the absorbance of the precursor solution according to the present invention at a wavelength of 660 nm is 0.1 or less.

This is based on the fact that the absorbance at a wavelength of 660 nm indicates the intensity of scattered light caused by minute particles present in the precursor solution. Accordingly, when the absorbance of the precursor solution according to the present invention is high, it is suggested that the concentration of minute particles present in the precursor solution is high (see HS-K0101, for example).

When a precursor solution containing minute particles at a high concentration is applied onto the electrode active material, protrusions and depressions are formed on the coating layer due to the minute particles adhering to the surface of the electrode active material, and thus the coating layer has a non-uniform thickness. If the coating layer has a non-uniform thickness, the coverage may decrease due to the generation of a thin film portion where the coating layer has an insufficient thickness, or an uncoated portion.

Studies conducted by the inventors of the present invention show that, when the value of the absorbance of the precursor solution at a wavelength of 660 nm is 0.1 or less, the amount of minute particles in the precursor solution is sufficiently small, and thus adverse effects on the thickness uniformity and coverage of the coating layer are suppressed.

Note that the value of the absorbance was obtained by measuring the absorbance of the precursor solution at a wavelength of 660 nm at 25° C. using an ultraviolet and visible spectrophotometer.

At this time, the lower limit of the absorbance is 0.000. However, the device detection limit of the ultraviolet and visible spectrophotometer used to measure the absorbance is 0.001.

The value of the surface energy of the precursor solution according to the present invention is 72 mN/m or less.

This is based on the fact that the reduction in the value of the surface energy of the precursor solution improves the wettability on the electrode active material, so that the precursor solution uniformly wets and spreads on the surface of the electrode active material when applied thereto, thus forming a uniform coating layer with fewer thin film portions, and thus, the coverage is improved. A sufficient coverage can be achieved by adjusting the value of the surface energy to 72 mN/m or less.

On the other hand, if the value of the surface energy of the precursor solution is excessively small relative to the value of the surface energy of the electrode active material, the precursor solution is likely to peel off the surface of the electrode active material. As a result, the likelihood of a non-uniform coating layer being formed and the coverage being reduced increases. Therefore, the surface energy is preferably 15 mN/m or more.

Note that the value of the surface energy of the precursor solution was measured using an automatic surface tensiometer while the temperature of the precursor solution was adjusted to 25° C.

Furthermore, the surface energy is mostly constituted by a dispersive component that is a force generated due to instantaneous charge deviation occurring between all molecules, and a polar component that is a force generated due to charge deviation occurring between polar molecules (note that a hydrogen bond component is considered as being encompassed in the polar component as a part thereof).

It is preferable to reduce the value of the polar component of the surface energy of the precursor solution according to the present invention to 45 mN/m or less. When the value of the polar component is reduced to 45 mN/m or less, the value of the polar component of the surface energy of the precursor solution is brought close to the value of the polar component of the surface energy of the electrode active material, and thus the wettability of the precursor solution on the electrode active material is further improved. For example, the surface energy of lithium cobalt oxide, which is a typical electrode active material and serves as a positive electrode active material, is 20.6 mN/m, and is constituted by a dispersive component of 18.4 mN/m and a polar component of 2.2 mN/m. On the other hand, the surface energy of pure water is 72.8 mN/m, and is constituted by a dispersive component of 21.8 mN/m and a polar component of 51.0 mN/m. That is to say, a difference in the value of the polar component between water and the positive electrode active material is especially prominent. From this viewpoint, a great effect can be obtained when the present invention is applied to a positive electrode active material.

Note that, in order to measure the values of the polar component and the dispersive component, the precursor solution is added dropwise onto a paraffin substrate at 25° C., and the contact angle is determined using the θ/2 method. Then, the values are calculated from the determined contact angle, the value of the surface energy of the precursor solution measured using an automatic surface tensiometer, and the literature value of the surface energy of paraffin using the Young-Dupre equation.

A precursor solution that differs less from the electrode active material in the value of the polar component more uniformly wets and spreads on the surface of the electrode active material when applied thereto, forming a uniform coating layer, and thus, the coverage is improved. That is to say, even if the values of the surface energy of precursor solutions are equal, a precursor solution that differs less from the electrode active material in the value of the polar component has better wettability on the surface of the electrode active material, so that such a precursor solution uniformly wets and spreads on the surface of the electrode active material when applied thereto, forming a uniform coating layer, and thus, the coverage is improved.

From this viewpoint, the value of the polar component of the surface energy of the precursor solution is preferably 0 mN/m or more and 45 mN/m or less. Also, the value of the polar component is particularly preferably 0 mN/m or more and 15.0 mN/m or less because such a value is even closer to that of the surface energy of the electrode active material, and thus the wettability is improved.

Note that a method for measuring the value of the polar component of the precursor solution will be described in the section "Examples".

Also, the wettability of the precursor solution according to the present invention on the electrode active material can be determined based on the contact angle of the precursor solution on a substrate with the same composition as the composition of the electrode active material. The contact angle is preferably 60° or less, and more preferably 50° or less. When the contact angle of the precursor solution on the substrate is 60° or less, the wettability on the electrode active material with the same composition as the composition of the substrate is good, so that the precursor solution uniformly wets and spreads on the surface of the electrode active material when applied thereto, forming a uniform coating layer, and thus, the coverage is improved.

Note that a method for measuring the contact angle of the precursor solution on the substrate will be described in the section "Examples".

With the precursor solution according to the present invention described above, an electrode active material having a coating layer can be produced by applying the precursor solution to a powder of an electrode active material and drying the precursor solution. Also, the precursor solution according to the present invention is free of components such as alkoxides that react with water in a normal atmosphere to produce precipitates insoluble in the solution, and thus has the advantage of being able to be handled in a nominal atmosphere and not requiring a dry-atmosphere equipment such as a dry room. Furthermore, the precursor solution according to the present invention has excellent wettability on the electrode active material, and can therefore coat the entire surface of the electrode active material without leaving any gaps in a single application. In addition, the coverage is improved, thus making it possible to suppress the formation of a high-resistance site from an insufficiently coated portion on the surface of the electrode active material.

(2) Method for Producing Lithium-Containing Oxide Precursor Solution for Coating Electrode Active Material A method for producing a precursor solution according to the present invention will be described in the following order: (1) Solvent, (2) Lithium Compound, (3) Element M Compound, and (4) Method for Producing Precursor Solution (1) Solvent Various solvents can be used as the solvent to be included in the precursor solution according to the present invention. However, as described above, a solvent composed mainly of water is used from the viewpoint of producing a precursor solution that is stable in a normal atmosphere. It is also preferable to use a solvent composed mainly of water as the solvent from the viewpoint of the cost of raw materials, the environmental load, workability, and the like.

Specifically, in order to produce the precursor solution according to the present invention, the water content in the solvent is adjusted such that a precursor solution contains water in an amount of 60 mass % or more and is thus stable in a normal atmosphere. On the other hand, the water content is adjusted such that the precursor solution contains water in an amount of 98.4 mass % or less, and it is thus possible to avoid an increase in the amount of the precursor solution used, the increase resulting from the low precursor concentration.

Furthermore, it is preferable that the solvent of the precursor solution according to the present invention contains a surfactant for the purpose of adjusting the value of the surface energy of the precursor solution.

(2) Lithium Compound

There is no particular limitation on a lithium compound, and any lithium compound can be used as long as it dissolves in the solvent used.

However, when a solvent composed mainly of water is used, preferred examples of the lithium compound include lithium salts such as lithium hydroxide (LiOH), lithium nitrate ($LiNO_3$), lithium sulfate ($Li_2SO_4$), lithium carbonate, and lithium nitrite. Lithium hydroxide is preferable because it does not bring impurities into the solution.

(3) Element M Compound

There is no particular limitation on an element M compound, and any element M compound can be used as long as it dissolves in the solvent used.

However, when a solvent composed mainly of water is used, if the element M can form a complex compound of the element M (also referred to as "element M complex" in the present invention), it is preferable to use the element M complex. This is because an element M complex is preferable in that it stably dissolves in a solvent composed mainly of water.

In particular, a peroxo complex of the element M can be suitably used as a water-soluble element M complex. A peroxo complex of the element M is particularly preferable because it does not contain carbon in its chemical structure and carbon does not remain in a coating film that is finally formed on the electrode active material.

On the other hand, a peroxo complex of niobium in a solution containing, for example, lithium and niobium as the element M can be identified by performing a measurement using a single reflection ATR method in which an FT-IR apparatus is used, with the angle of incidence on a germanium prism being set to 45°.

If peaks at 855 cm$^{-1}$±20 cm$^{-1}$ and 1650 cm$^{-1}$±10 cm$^{-1}$, which are attributed to a peroxo complex, are observed as a result of the measurement, niobium dissolved in the solution containing lithium and niobium can be considered to be in the form of a niobium complex (or more specifically, peroxo complex).

Note that, when P is used as the element M, it is preferable to use lithium phosphate, which is a water-soluble compound of phosphorus and lithium.

(4) Method for Producing Precursor Solution

There is no particular limitation on a method for producing a precursor solution. Accordingly, as an example of the production method, a method for producing a precursor solution containing lithium and niobium complex using Nb as the element M will be described in the following order:

(1) Niobium Dissolving Step, (2) Lithium Dissolving Step, (3) Surface Energy Adjusting Step, and (4) Filtration Step.

(1) Niobium Dissolving Step

In a niobium dissolving step, a solution is prepared by adding niobic acid ($Nb_2O_5 \cdot nH_2O$) to, for example, a hydrogen peroxide solution, mixing them, further adding an alkali such as aqueous ammonia to the mixture to produce a transparent solution containing a peroxo complex of niobium as a niobium compound, and dissolving the resultant solution in a solvent composed mainly of water to be included in the lithium-containing oxide precursor solution for coating an electrode active material according to the present invention. There is no particular limitation on the mixing ratio between the hydrogen peroxide solution, niobic acid, alkali such as aqueous ammonia, and the like as long as a peroxo complex of niobium can be synthesized.

When a peroxo complex of niobium is used as a niobium complex, it is preferable that the value of the molar ratio of hydrogen peroxide to 1 mol of niobium is 4 or more when niobic acid is added to and mixed with a hydrogen peroxide solution.

On the other hand, even if niobic acid is added to a hydrogen peroxide solution such that the value of the molar ratio of hydrogen peroxide to 1 mol of niobium exceeds 30, the effect is considered to reach its limit. Accordingly, the value of the molar ratio of hydrogen peroxide to 1 mol of niobium is preferably 20 or less, and more preferably 15 or less.

When niobic acid is added to and mixed with a hydrogen peroxide solution, the temperature of the hydrogen peroxide solution is 0° C. or higher, and preferably 60° C. or lower from the viewpoint of avoiding decomposition of the hydrogen peroxide solution.

During this mixing, the niobic acid does not dissolve in the hydrogen peroxide solution, but a milk-white suspension containing niobic acid can be obtained.

A transparent solution containing a peroxo complex of niobium can be obtained by adding an alkali such as aqueous ammonia to the suspension containing niobic acid and mixing them.

When aqueous ammonia is added, as an alkali, to the suspension containing niobic acid, it is preferable that the value of the molar ratio (ammonia/Nb) of ammonia to 1 mol of niobium is 3 or more.

On the other hand, even if aqueous ammonia is added to the suspension such that the value of the molar ratio of ammonia to 1 mol of niobium exceeds 8, the effect is considered to reach its limit. Accordingly, the value of the molar ratio of ammonia to 1 mol of niobium is preferably 6 or less.

When an alkali such as aqueous ammonia is added to and mixed with the suspension containing niobic acid, the temperature of the aqueous ammonia or the like is 0° C. or higher, and preferably 60° C. or lower from the viewpoint of avoiding volatilization of ammonia.

Furthermore, an alkaline aqueous solution can also be added in addition to the aqueous ammonia. In this case, the addition amount of the alkaline aqueous solution is determined such that the value of pH of the aqueous solution after adding the alkaline aqueous solution is 8 or more, and preferably 9 or more. In a preferred configuration, an aqueous solution of lithium hydroxide is added as the alkaline aqueous solution. On the other hand, if the value of pH of the aqueous solution after adding the alkaline aqueous solution is 11 or more, the niobium complex becomes unstable, and thus an insoluble precipitation may be generated. Therefore, the above-mentioned value of pH is preferably less than 11.

(2) Lithium Dissolving Step

In a lithium dissolving step, a solution is prepared by adding a lithium compound to a solvent composed mainly of water to be included in the lithium-containing oxide precursor solution for coating an electrode active material according to the present invention under an inert gas atmosphere or air atmosphere, and dissolving the lithium compound.

If the amount of lithium is excessively small compared with the amount of niobium in the lithium-containing oxide precursor solution for coating an electrode active material according to the present invention that is produced, when lithium niobate represented by LiNbO$_3$ is formed as a coating layer for the electrode active material, the lithium conductivity of the coating layer may be degraded. On the other hand, if the amount of lithium is excessively large compared with the amount of niobium, lithium hydroxide or lithium nitrite with no lithium conductivity may be mixed in lithium niobate constituting the coating layer, thus degrading the lithium conductivity of the coating layer.

The above-described phenomenon in which lithium hydroxide or lithium nitrite with no lithium conductivity is mixed in lithium niobate constituting the coating layer may occur even in cases other than the case where Nb is used as the element M. In order to avoid this mixing phenomenon, the value of the molar ratio (Li/M) of lithium to 1 mol of the element M is preferably 0.36 or more and 11.2 or less. When Nb is used as the element M, the value of the molar ratio (Li/Nb) of lithium to 1 mol of niobium is more preferably 0.90 or more and 1.4 or less. When P is used as the element M, the value of the molar ratio (Li/P) of lithium to 1 mol of phosphorus is also more preferably 0.90 or more and 1.4 or less.

It is convenient to employ a nitrogen gas atmosphere as the inert gas atmosphere.

The above-described "(1) Niobium Dissolving Step" and "(2) Lithium Dissolving Step" may be performed in any order as desired, or may be performed simultaneously.

(3) Surface Energy Adjusting Step

Adding an appropriate amount of surfactant to the solvent to be included in the precursor solution according to the present invention makes it possible to control the value of the surface energy of the solvent, and the value of the polar component.

Here, the term "surfactant" refers to a substance that has a hydrophilic portion and a hydrophobic (lipophilic) portion in the molecule and that is adsorbed on a water-oil two-phase interface due to its hydrophilic-lipophilic balance, thereby having the effect of lowering the interface free energy (interface tension).

As the surfactant, an alcohol and a nonionic surfactant having a nonionic polar group are preferable.

As the alcohol, those, such as 1,2-propanediol and 1-butanol, containing three or more carbon atoms in the molecule, being soluble in water, and being capable of ensuring the stability of the niobium complex are particularly preferable.

Furthermore, from the viewpoint of ensuring the stability of the niobium complex and the viewpoint of solubility in water, alcohols containing three to six carbon atoms in the molecule are particularly preferable, and alcohols containing three or four carbon atoms are even more preferable.

It is preferable to add an alcohol having three or more carbon atoms in the molecule to the precursor solution according to the present invention because the stability of the niobium complex in the solution is ensured. Alcohols having six or less carbon atoms in the molecule are preferable because they are highly soluble in water and are uniformly dispersed in a solution containing water, and thus an effect of reducing the surface energy of the solvent to be included in the precursor solution according to the present invention can be easily obtained.

Alcohols having four or less carbon atoms in the molecule are more preferable because they are particularly highly soluble in water and are more uniformly dispersed in a solution containing water, and thus an effect of reducing the surface energy of the solvent to be included in the precursor solution according to the present invention can be easily obtained.

Specific examples of preferred alcohols include isopropyl alcohol, 1-propanol, 1-butanol, 2-methyl-1-propanol, 2-butanol, 2-methyl-2-propanol, 1-pentanol, 3-methyl-1-butanol, 2-methyl-1-butanol, 2,2-dimethyl-1-propanol, 2-pentanol, 3-methyl-2-butanol, 3-pentanol, 2-methyl-2-butanol, 3-methyl-1-pentanol, 4-methyl-1-pentanol, 2-methyl-2-pentanol, 3-methyl-2-pentanol, 4-methyl-2-pentanol, 2-methyl-3-pentanol, 3-methyl-3-pentanol, 2,2-dimethyl-1-butanol, 2,3-dimethyl-1-butanol, 3,3-dimethyl-1-butanol, 2,3-dimethyl-2-butanol, 3,3-dimethyl-2-butanol, and 2-ethyl-1-butanol.

As the nonionic surfactant, those in which the nonionic polar group includes an ether bond are preferable.

Specific examples of preferred nonionic surfactants include those in which the nonionic polar group includes an ether bond, such as polyoxyethylene ethers (e.g., Ftergent (registered trademark) 222F with 22 moles of ethylene oxide added (manufactured by Neos Company Limited)), polyoxyethylene alkyl ethers (e.g., LEOCOL (registered trademark) TD-120 with 12 moles of ethylene oxide added (manufactured by Lion Corporation)), diethylene glycol diethyl ethers (e.g., DEDG (registered trademark) with 2 moles of ethylene oxide added (manufactured by Nippon Nyukazai Co., Ltd.)), and polyoxyethylene lauryl ethers (e.g., EMULGEN (registered trademark) 108 with 6 moles of ethylene oxide added (manufactured by Kao Corporation)).

Furthermore, nonionic surfactants with 10 or more moles of ethylene oxide added are more preferable because they are more favorably dispersed in water, and thus an effect of reducing the surface energy of the solvent to be included in the precursor solution according to the present invention can be easily obtained.

Regarding the amount of one or more selected from alcohols and nonionic surfactants that are added to the solvent to be included in the precursor solution according to the present invention in order to control the value of the surface energy of the solvent and the value of the polar component, a surfactant is contained in an amount of 0.01 mass % or more and 20.0 mass % or less, from the viewpoint of reducing the surface energy and controlling the value of the polar component to improve the wettability on the electrode active material. When the surfactant is an alcohol, the amount of the surfactant added is preferably 0.1 mass % or more and 20.0 mass % or less, and more preferably 1.0 mass % or more and 10.0 mass % or less. On the other hand, when the surfactant is a nonionic surfactant, the amount of the surfactant added is preferably 0.01 mass % or more and 10.0 mass % or less, and more preferably 0.01 mass % or more and 5.0 mass % or less.

The one or more selected from alcohols and nonionic surfactants are added in an amount within the above-described range of the amount added, while measuring the value of the surface energy of the solvent and the value of the polar component. The value of the surface energy is adjusted to 72 mN/m or less. At this time, the value of the polar component is preferably adjusted to 0 mN/m or more and 45 mN/m or less. The value of the surface energy is more preferably adjusted to 15 mN/m or more and 40 mN/m or less, and at this time, the value of the polar component is more preferably adjusted to 0 mN/m or more and 15 mN/m or less.

Note that the above-described "(1) Niobium Dissolving Step" and "(2) Lithium Dissolving Step" may be performed before or after the "(3) Surface Energy Adjusting Step" as desired.

(4) Filtration Step

In a filtration step, the aqueous solution containing lithium and a niobium complex obtained by performing the above-described "(1) Niobium Dissolving Step" and "(2) Lithium Dissolving Step" is filtered, and thus a precursor solution whose value of absorbance at a wavelength of 660 nm is 0.1 or less is obtained.

However, the "(4) Filtration Step" may be omitted if the value of absorbance at a wavelength of 660 nm of the aqueous solution containing lithium and a niobium complex obtained by performing the above-described "(1) Niobium Dissolving Step" and "(2) Lithium Dissolving Step" is already 0.1 or less before performing the "(4) Filtration Step".

Note that the "(4) Filtration Step" may be performed before or after the "(3) Surface Energy Adjusting Step" as desired.

There is no particular limitation on the filtration method, and examples thereof include centrifugation and filtration performed using various filters. Filtration performed using a membrane filter is preferable from the viewpoint of minute particle removal efficiency and productivity. Pressure filtration performed using a filter under pressure, microfiltration performed using a filter with a minute pore size under pressure, and ultrafiltration are preferable from the viewpoint of productivity.

The liquid temperature during filtration is preferably 10° C. or higher and 40° C. or lower from the viewpoint of filtration productivity and suppressing a change in characteristics of the solution. When the liquid temperature is 10° C. or higher, the viscosity of the solution decreases, and thus the filtration speed is ensured. When the liquid temperature is 40° C. or lower, a change in characteristics of the solution caused by a decrease in the amount of the solution due to volatilization of volatile components or decomposition of components can be suppressed.

A filter with a pore size of 0.5 μm or less is used from the viewpoint of minute particle removal efficiency and productivity. In particular, it is preferable to use a membrane filter with a pore size of 0.1 μm from the viewpoint of minute particle removal efficiency.

The pressure applied during filtration is preferably 0.05 MPa or more and 0.6 MPa or less, and more preferably 0.1 MPa or more and 0.4 MPa or less, from the viewpoint of minute particle removal efficiency and productivity.

Note that it is preferable to confirm that the balance between the components contained in the precursor solution obtained through the filtration step is ensured due to the removal of minute particles.

EXAMPLES

Hereinafter, the present invention will be described in detail with reference to examples. The present invention is not limited to the examples below.

Comparative Example 1

An aqueous solution of hydrogen peroxide was prepared by adding 7.7 g of hydrogen peroxide solution with a concentration of 35 mass % to 19.6 g of pure water. Then, 4.4 g of niobic acid ($Nb_2O_5 \cdot nH_2O$ ($Nb_2O_5$ content 58.0%)) was added to this aqueous solution of hydrogen peroxide.

After the addition of niobic acid, the temperature was adjusted so that the liquid temperature of the solution containing niobic acid was within a range of 20° C. to 30° C.

Then, 3.5 g of aqueous ammonia with a concentration of 28 mass % was added to this solution containing niobic acid, and the resulting mixture was sufficiently stirred in a normal atmosphere to obtain a transparent solution.

Under a nitrogen gas atmosphere, 0.9 g of lithium hydroxide monohydrate ($LiOH \cdot H_2O$) was added to the obtained transparent solution to obtain a transparent aqueous solution containing lithium and a peroxo complex of niobium. Then, the aqueous solution containing lithium and the peroxoniobium complex was left to stand at a temperature of 25° C. for about 6 hours.

When a precipitate was formed during the standing, the aqueous solution containing lithium and the peroxoniobium complex was stirred to such an extent that the precipitate was dispersed, and then filtered through a membrane filter with a pore size of 0.1 Thus, a lithium niobate precursor solution according to Comparative Example 1 was obtained.

The obtained precursor solution according to Comparative Example 1 was subjected to (1) quantitative analysis of the lithium content and the niobium content, (2) quantitative analysis of the water content, (3) measurement of absorbance, (4) evaluation of the surface energy of the solution, (5) evaluation of the polar component and the dispersive component of the surface energy of the solution, (6) evaluation of the contact angle on an LNCM(111) substrate, (7) evaluation of the contact angle on an LNM(13) substrate, (8) evaluation of the contact angle on an LNCM(811) substrate, and (9) evaluation of the coverage. Hereinafter, each measurement item will be described.

The LNM(13) substrate is an $LiNi_{1/2}Mn_{3/2}O_4$ sputter-deposited substrate, and is also referred to as an "LNM(13) substrate" in the present invention. The LNCM(811) substrate is an $LiNi_{4/5}Co_{1/10}Mn_{1/10}O_2$ sputter-deposited substrate, and is also referred to as an "LNCM(811) substrate" in the present invention (1) Quantitative Analysis of Lithium Content and Niobium Content The components of the precursor solution (Li content, element M content) were analyzed through inductively coupled plasma atomic emission spectroscopy (ICP-AES; using CP-720 manufactured by Agilent Technologies Japan, Ltd.). Table 1 shows the results.

Note that the ICP-AES measurement was performed as follows: 0.1 g of a sample was weighed, pure water and hydrochloric acid were added thereto, the resultant mixture was heated and was then allowed to cool, a hydrogen peroxide solution was further added to the mixture, the resultant mixture was heated and was then allowed to cool, the volume of the liquid was adjusted to 100 mL, and the liquid was diluted and was then measured through ICP-AES.

(2) Quantitative Analysis of Water Content

The water content was measured through volumetric titration using a Karl Fischer moisture meter.

Specifically, a volumetric titration type Karl Fischer moisture meter (MKA-610 manufactured by Kyoto Electronics Manufacturing Co., Ltd.) was used, Composite 5K manufactured by Honeywell was used as a titrant, and Medium K manufactured by Honeywell was used as a solvent.

After the solvent contained in a titration flask was made anhydrous with the titrant, a sample was directly added thereto, and the water content was measured. Table 1 shows the results.

(3) Measurement of Absorbance

A 3.5-mL aliquot of the precursor solution was placed in a quartz cell (10 mm×10 mm×45 mm), and the absorbance at wavelengths ranging from 400 nm to 700 nm was measured using an ultraviolet and visible spectrophotometer (UV-1800 manufactured by Shimadzu Corporation). The temperature of the precursor solution was kept at 25° C. during the measurement.

At this time, ultrapure water with an electric conductivity of 17 MΩ·cm or more at 25° C. was placed in the measurement cell, and the absorbance thereof was measured and used as the zero point of absorbance.

Table 2 shows the results of the absorbance at a wavelength of 660 nm. Note that the absorbance at a wavelength of 660 nm indicates the intensity of scattered light caused by minute particles present in the precursor solution, and high absorbance suggests that the concentration of minute particles is high (see JIS-K0101, for example).

The absorbance at a wavelength of 400 nm suggests the concentration of minute particles with a smaller particle diameter compared with those suggested by the absorbance at a wavelength of 660 nm, or anions.

(4) Evaluation of Surface Energy of Solution

The value of the surface tension of the precursor solution was measured at 25° C. using an automatic surface tensiometer CBVP-Z manufactured by Kyowa Interface Science Co., Ltd., and was used as the value of the surface energy. Table 2 shows the results.

(5) Evaluation of Polar Component and Dispersive Component of Surface Energy of Solution A glass slide was dipped in paraffin (FUJIFILM Wako Pure Chemical Corporation, 1st grade reagent) melted at 90° C. on a hot plate. After the glass slide was removed therefrom, the glass slide was slowly cooled in a normal atmosphere at 25° C. to prepare a paraffin substrate. The surface roughness Ra measured using a shape measurement laser microscope (VK-9710 manufactured by Keyence Corporation) was 15.181 μm.

With the paraffin substrate temperature set to 25° C. and the solution set to 25° C., about 10 μL, of the precursor solution was added dropwise onto the substrate in a normal atmosphere, and the contact angle after 3 seconds was obtained using the θ/2 method.

Based on the obtained contact angle, the value of the surface energy of each precursor solution measured in "(4) Evaluation of Surface Energy of Solution", and literature values regarding the surface energy of paraffin (surface energy: $\gamma=25.5$ mJ/m$^2$, dispersive component of surface energy: $\gamma^d=25.5$ mJ/m$^2$, and polar component of surface energy: $\gamma^p=0.00$ mJ/m$^2$), the values of the polar component and the dispersive component constituting the value of the surface energy of the precursor solution were calculated using the Young-Dupre equation. Table 2 shows the results.

(6) Evaluation of Contact Angle on LNCM(111) Substrate

An $LiNi_{1/3}Co_{1/3}Mn_{1/3}O_2$ sputter-deposited substrate (Toshima Manufacturing Co., Ltd.; target film thickness: 50 nm, LNCM(111) substrate: SLG-25 mm, smoothness of base material: Ra 0.021 μm, substrate non-heating condition) was prepared.

In order to remove water attached to the surface of the LNCM(111) substrate, the substrate was heated at 220° C. for 1 hour or more in a vacuum (gauge pressure: —0.1 MPa or less). Thereafter, the substrate was slowly cooled to room temperature in a vacuum, and was then stored under an N2 atmosphere.

In order to suppress the influence of attachment of water in a normal atmosphere, the contact angle was evaluated within 5 minutes after the substrate was removed from the N2 atmosphere.

With the substrate temperature set to 25° C. and the solution temperature set to 25° C., about 10 of the precursor solution was added dropwise onto the LNCM(111) substrate in a normal atmosphere, and the contact angle after 3 seconds was obtained using the θ/2 method. Table 2 shows the results.

(7) Evaluation of Contact Angle on LNM(13) Substrate

An $LiNi_{1/2}Mn_{3/2}O_4$ sputter-deposited substrate (Toshima Manufacturing Co., Ltd.; target film thickness: 50 nm, LNM(13) substrate: SLG-25 mm, smoothness of base material: Ra 0.021 μm, substrate non-heating condition) (also referred to as an "LNM(13) substrate" hereinafter) was prepared.

The contact angle was measured in the same manner as in the case of the LNCM(111) substrate. Table 2 shows the results.

(8) Evaluation of Contact Angle on LNCM(811) Substrate

An $LiNi_{4/5}Co_{1/10}Mn_{1/10}O_2$ sputter-deposited substrate (Toshima Manufacturing Co., Ltd.; target film thickness: 50 nm, LNCM(811) substrate: SLG-25 mm, smoothness of base material: Ra 0.021 μm, substrate non-heating condition) (also referred to as an "LNCM(811) substrate" hereinafter) was prepared.

The LNCM(811) substrate was used to measure the contact angle of the precursor solution in the same manner as in the case of the LNCM(111) substrate. Table 2 shows the results.

(9) Evaluation of Coverage

A method for evaluating the coverage of the coating film on the surface of the electrode active material will be described in the following order: (1) Preparation of Slurry Containing Electrode Active Material and Precursor Solution, (2) Production of Coated Electrode Active Material Precursor, (3) Production of Coated Electrode Active Material, and (4) Evaluation of Coverage.

(1) Preparation of Slurry Containing Electrode Active Material and Precursor Solution As the electrode active material, 40.0 g of $LiNi_{1/3}Co_{1/3}Mn_{1/3}O_2$ serving as a positive electrode active material was placed in a beaker, 23.3 g of a sample solution of the precursor solution was further added to the beaker, and then the mixture was stirred using a magnetic stirrer to prepare a slurry.

(2) Production of Coated Electrode Active Material Precursor

The prepared slurry was supplied to a spray dryer (Mini Spray Dyer B-290 manufactured by BUCHI) at a rate of 0.5 g/sec using a liquid feed pump. Slurry droplets were dried in an air flow, and a coated electrode active material precursor was collected.

The spray dryer was operated under the following conditions.

Air supply temperature: 200° C.
Supply airflow rate: 0.45 m³/min (3) Production of Coated Electrode Active Material The coated electrode active material precursor was fired at 200° C. for 5 hours using a muffle furnace to synthesize lithium niobate on the surface of the electrode active material, and thus, a coated electrode active material was obtained.

(4) Evaluation of Coverage

The coated electrode active material was subjected to surface element analysis using an X-ray photoelectron spectroscope (X-tool manufactured by ULVAC-PHI, Inc.).

Then, the element ratio of the surface was obtained from the various peaks of $Nb_{3d}$, $Ni_{2p3}$, $Co_{2p3}$, and $Mn_{2p3}$, and the niobium concentration on the surface of the coated electrode active material was calculated using the equation below.

(Note that, in the equation below, the symbols of the elements represent the percentages (atomic %) of the respective elements.)

$$\text{Niobium concentration on surface of electrode active material } (\%)=(100{\times}Nb)/(Ni+Co+Mn+Nb) \quad \text{(equation)}$$

The calculated niobium concentration on the surface of the electrode active material according to Comparative Example 1 was used as a reference value. Table 2 shows that the niobium concentration on the surface of the electrode active material according to Comparative Example 1 was used as a "reference value".

When the electrode active material also contains the element M contained in the precursor solution, the coverage can be determined by making a calculation after subtracting the molar fraction of the element M included in the electrode active material from the molar fractions of the element M in the denominator and the numerator in the equation above. The molar fraction of the element M included in the electrode active material can be determined by etching the lithium-containing oxide coating layer of the coated electrode active material using an appropriate technique and then performing the measurement using X-ray photoelectron spectroscopy. It is sufficient that etching is performed in accordance with the following method, for example: the coated electrode active material is etched to a depth of about 100 nm in terms of element M oxide using an ion sputtering apparatus included in the X-ray photoelectron spectroscope.

Example 1

A solution containing lithium and a peroxo complex of niobium was prepared in the same manner as in Comparative Example 1.

A lithium niobate precursor solution according to Example 1 was obtained by adding 0.3 g of 1,2-propanediol (special grade chemical) to 29.7 g of the prepared solution containing lithium and a peroxo complex of niobium and stirring the mixture for 10 minutes or more while the temperature was adjusted so that the liquid temperature was within a range of 20° C. to 30° C.

In the same manner as in Comparative Example 1, the obtained precursor solution according to Example 1 was subjected to (1) quantitative analysis of the lithium content and the niobium content, (2) quantitative analysis of the water content, (3) measurement of absorbance, (4) evaluation of the surface energy of the solution, (5) evaluation of the polar component and the dispersive component of the surface energy of the solution, (6) evaluation of the contact angle on an LNCM(111) substrate, (7) evaluation of the contact angle on an LNM(13) substrate, and (8) evaluation of the contact angle on an LNCM(811) substrate. Tables 1 and 2 show the results.

Also, "(9) evaluation of coverage" was performed in the same manner as in Comparative Example 1, and the niobium concentration on the surface of the electrode active material according to Example 1 was calculated. It was thus found that the niobium concentration on the surface of the electrode active material according to Example 1 was +5% higher than the reference value calculated in Comparative Example 1. This result +5% corresponding to the increase in the niobium concentration is shown as a relative value of the increase in coverage in Table 2.

Example 2

A lithium niobate precursor solution according to Example 2 was obtained in the same manner as in Example 1, except that 3.0 g of 1,2-propanediol (special grade chemical) was added to 27.0 g of the solution containing lithium and a peroxo complex of niobium.

The obtained precursor solution according to Example 2 was subjected to the same evaluations as described above in Comparative Example 1 and Example 1. Tables 1 and 2 show the results.

Figure 4:
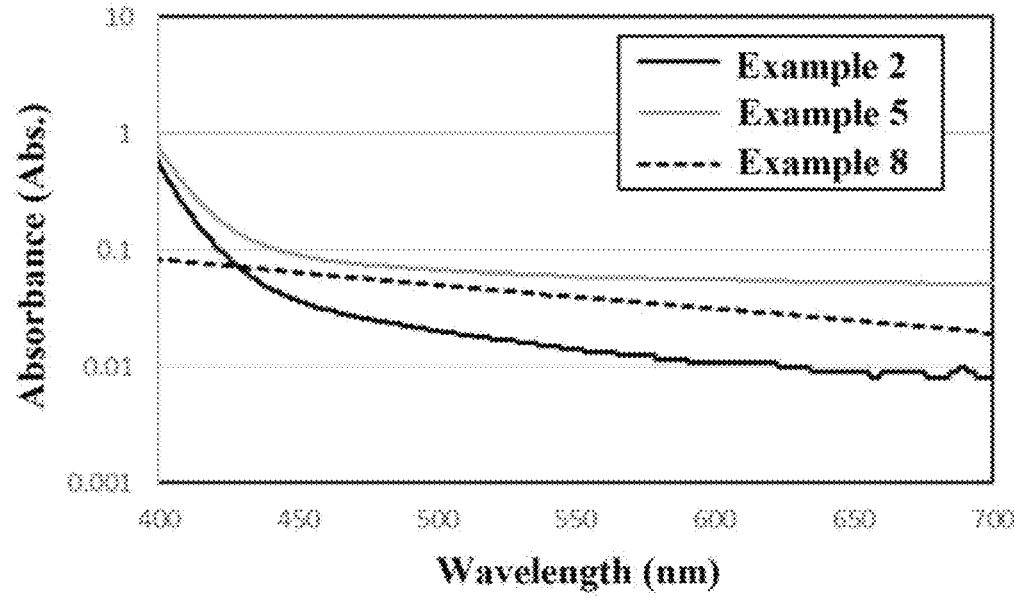
FIG. 4 is a graph showing the results of measurement of absorbance at wavelengths ranging from 400 nm to 700 nm with respect to precursor solutions according to Examples 2, 5, and 8.

Furthermore, in Example 2, the measurement result of the absorbance of the precursor solution at a wavelength of 400 nm is shown in Table 2, and the measurement results of the absorbance at wavelengths ranging from 400 nm to 700 nm are shown by a black solid line in FIG. 4.

Example 3

A lithium niobate precursor solution according to Example 3 was obtained in the same manner as in Example 1, except that 0.3 g of 1-butanol (special grade chemical) was added to 29.7 g of the solution containing lithium and a peroxo complex of niobium.

The obtained precursor solution according to Example 3 was subjected to the same evaluations as described above in Comparative Example 1 and Example 1. Tables 1 and 2 show the results.

Example 4

A lithium niobate precursor solution according to Example 4 was obtained in the same manner as in Example 1, except that 0.03 g of Ftergent 222F (manufactured by Neos Company Limited) was added to 29.97 g of the solution containing lithium and a peroxo complex of niobium instead of adding 1,2-propanediol.

The obtained precursor solution according to Example 4 was subjected to the same evaluations as described above in Comparative Example 1 and Example 1. Tables 1 and 2 show the results.

Example 5

A lithium niobate precursor solution according to Example 5 was obtained in the same manner as in Example 1, except that 0.3 g of Ftergent 222F (manufactured by Neos Company Limited) was added to 29.7 g of the solution containing lithium and a peroxo complex of niobium instead of adding 1,2-propanediol.

The obtained precursor solution according to Example 5 was subjected to the same evaluations as described above in Comparative Example 1 and Example 1. Tables 1 and 2 show the results.

Furthermore, in Example 5, the measurement result of the absorbance of the precursor solution at a wavelength of 400 nm is shown in Table 2, and the measurement results of the absorbance at wavelengths ranging from 400 nm to 700 nm are shown by a gray solid line in FIG. 4.

Example 6

A lithium niobate precursor solution according to Example 6 was obtained in the same manner as in Example 1, except that 0.3 g of LEOCOL TD-120 (manufactured by Lion Corporation) was added to 29.7 g of the solution containing lithium and a peroxo complex of niobium instead of adding 1,2-propanediol.

The obtained precursor solution according to Example 6 was subjected to the same evaluations as described above in Comparative Example 1 and Example 1. Tables 1 and 2 show the results.

Example 7

A lithium niobate precursor solution according to Example 7 was obtained in the same manner as in Example 1, except that 0.3 g of DEDG (manufactured by Nippon Nyukazai Co., Ltd.) was added to 29.7 g of the solution containing lithium and a peroxo complex of niobium instead of adding 1,2-propanediol.

The obtained precursor solution according to Example 7 was subjected to the same evaluations as described above in Comparative Example 1 and Example 1. Tables 1 and 2 show the results.

Comparative Example 2

An aqueous solution of lithium nitrate was prepared by adding 0.16 g of lithium nitrate to 8.55 g of pure water. Then, 0.80 g of niobium pentaethoxide and 0.03 g of EMULGEN 108 (manufactured by Kao Corporation) were added to the aqueous solution of lithium nitrate. The liquid obtained by adding niobium pentaethoxide and EMULGEN 108 to the aqueous solution of lithium nitrate was sufficiently stirred in a normal atmosphere while the temperature was adjusted so that the liquid temperature was within a range of 20° C. to 30° C., and thus a milky precursor solution according to Comparative Example 2 was obtained.

The obtained precursor solution according to Comparative Example 2 was subjected to the same evaluations as described above in Comparative Example 1. Tables 1 and 2 show the results.

Note that, in the precursor solution according to Comparative Example 2, minute particles were generated due to precipitation of the solute, and therefore, the nozzle of the spray dryer was blocked during the production of the precursor of the coated electrode active material, thus failing to produce the coated electrode active material. Accordingly, "(9) evaluation of coverage" was not performed.

Comparative Example 3

First, 170 mL of pure water was mixed with 0.7226 g of lithium phosphate, and the pH of the mixture was adjusted to 10 by adding aqueous ammonia thereto. The prepared mixed liquid of lithium phosphate and water was sufficiently stirred in a normal atmosphere while the temperature was adjusted so that the liquid temperature of the mixed liquid was within a range of 20° C. to 30° C., and thus, a transparent solution was obtained.

The obtained transparent solution was filtered through a membrane filter with a pore size of 0.1 μm, and thus, a precursor solution according to Comparative Example 3, which was a solution containing lithium and phosphoric acid, was obtained.

Note that the absorbance of the precursor solution according to Comparative Example 3 was less than 0.001, which was the detection limit.

In the same manner as in Comparative Example 1, the obtained precursor solution according to Comparative Example 3 was subjected to (1) quantitative analysis of the lithium content and the phosphorus content, (2) quantitative analysis of the water content, (3) measurement of absorbance, (4) evaluation of the surface energy of the solution, (5) evaluation of the polar component and the dispersive component of the surface energy of the solution, (6) evaluation of the contact angle on an LNCM(111) substrate, (7) evaluation of the contact angle on an LNM(13) substrate, and (8) evaluation of the contact angle on an LNCM(811) substrate. Tables 1 and 2 show the results.

In "(9) evaluation of coverage", a coated electrode active material according to Comparative Example 3 was obtained by synthesizing lithium phosphate on the surface of the electrode active material in the same manner as in Comparative Example 1, except that the sample solution of the precursor solution according to Comparative Example 3 was used in "Preparation of Slurry Containing Electrode Active Material and Precursor Solution".

Evaluation of Coverage

The coated electrode active material was subjected to surface element analysis using an X-ray photoelectron spectroscope (X-tool manufactured by ULVAC-PHI, Inc.).

Then, the element ratio of the surface was obtained from the various peaks of $P_{2p}$, $Ni_{2p3}$, $Co_{2p3}$, and $Mn_{2p3}$, and the phosphorus concentration on the surface of the coated electrode active material was calculated using the equation below.

(Note that, in the equation below, the symbols of the elements represent the percentages (atomic %) of the respective elements.)

$$\text{Phosphorus concentration on surface of electrode active material (\%)} = (100 \times P)/(Ni+Co+Mn+P) \quad \text{(equation)}$$

The calculated phosphorus concentration on the surface of the electrode active material according to Comparative Example 3 was used as a reference value for the phosphorus concentration.

Table 2 shows that the phosphorus concentration on the surface of the electrode active material according to Comparative Example 3 was used as a "reference value".

Example 8

A solution containing lithium and phosphoric acid was prepared in the same manner as in Comparative Example 3.

Then, 0.3 g of EMULGEN 108 (manufactured by Kao Corporation) was added to 29.7 g of the obtained solution containing lithium and phosphoric acid, and the mixture was stirred for 10 minutes or more while the temperature was adjusted so that the liquid temperature was within a range of 20° C. to 30° C. Thus, a precursor solution according to Example 8 was obtained.

In the same manner as in Comparative Example 3, the obtained precursor solution according to Example 8 was subjected to (1) quantitative analysis of the lithium content and the phosphorus content, (2) quantitative analysis of the water content, (3) measurement of absorbance, (4) evaluation of the surface energy of the solution, (5) evaluation of the polar component and the dispersive component of the surface energy of the solution, (6) evaluation of the contact angle on an LNCM(111) substrate, (7) evaluation of the contact angle on an LNM(13) substrate, and (8) evaluation of the contact angle on an LNCM(811) substrate. Tables 1 and 2 show the results.

Furthermore, in Example 8, the measurement result of the absorbance of the precursor solution at a wavelength of 400 nm is shown in Table 2, and the measurement results of the absorbance at wavelengths ranging from 400 nm to 700 nm are shown by a black broken line in FIG. 4.

Also, "(9) evaluation of coverage" was performed in the same manner as in Comparative Example 3, and the phosphorus concentration on the surface of the electrode active material according to Example 8 was calculated. It was thus found that the phosphorus concentration on the surface of the electrode active material according to Example 8 was +6% higher than the reference value calculated in Comparative Example 3. This result +6% corresponding to the increase in the phosphorus concentration is shown as a relative value of the increase in coverage in Table 2.

CONCLUSION

Figure 2:
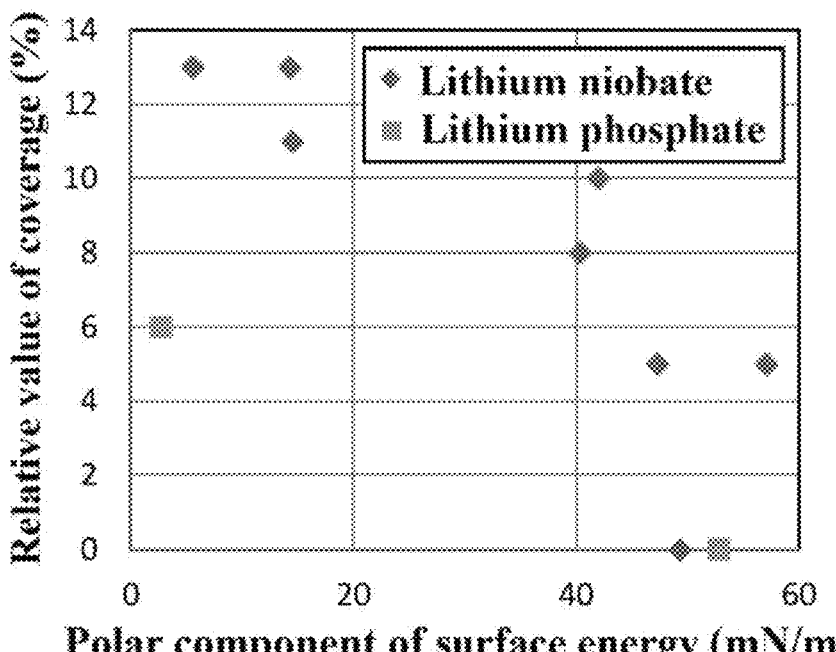
FIG. 2 is a graph showing the relationship between the value of a polar component of surface energy and the coverage with respect to the lithium-containing oxide precursor solutions for coating an electrode active material.

With respect to the above-described precursor solutions according to Examples 1 to 8 and Comparative Examples 1 and 3, a graph showing the relationship between the surface energy and the coverage in which the horizontal axis indicates the value of the surface energy and the vertical axis indicates the relative value of the increase in coverage is shown in FIG. 1, and a graph showing the relationship between the value of the polar component of the surface energy and the coverage in which the horizontal axis indicates the value of the polar component of the surface energy and the vertical axis indicates the relative value of the increase in coverage is shown in FIG. 2.

From the graph in FIG. 1, it can be understood that, with respect to the precursor solutions according to the examples, when the value of the surface energy is 72 mN/m or less, sufficient coverage is achieved for the electrode active material.

From the graph in FIG. 2, it can also be understood that, with respect to the precursor solutions according to the examples, when the value of the polar component of the surface energy is 45 mN/m or less, high coverage is achieved for the electrode active material.

Figure 3:
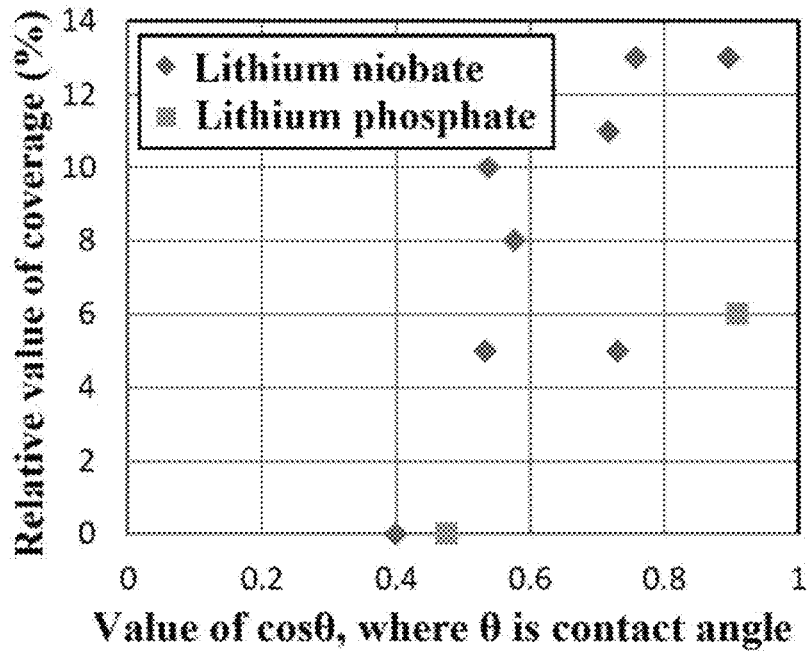
FIG. 3 is a graph showing the relationship between the value of cos θ, where θ is the contact angle on an $LiNi_{1/3}Co_{1/3}Mn_{1/3}O_2$ sputter-deposited substrate (also referred to as an "LNCM(111) substrate" in the present invention; the figures in the parentheses indicate the compositional ratio between Ni, Co, and Mn in the composition), and the coverage with respect to the lithium-containing oxide precursor solutions for coating an electrode active material.

With respect to the above-described Examples 1 to 8 and Comparative Examples 1 and 3, a graph showing the relationship between the value of cos θ, where θ is the contact angle on the LNCM(111) substrate, and the coverage in which the horizontal axis indicates the value of cos θ, where θ is the contact angle on the substrate, and the vertical axis indicates the relative value of the increase in coverage is shown in FIG. 3.

From the graph in FIG. 3, it can be understood that the value of cos θ, where θ is the contact angle on the $LiNi_{1/3}Co_{1/3}Mn_{1/3}O_2$ sputter-deposited substrate, and the coverage are in proportion to each other. That is to say, it is considered that, when the value of cos θ, where θ is the contact angle of the precursor solution on the substrate, is large (θ is small), the wettability on the electrode active material with the same composition as the composition of the substrate is good, so that the precursor solution uniformly wets and spreads on the surface of the electrode active material when applied thereto, forming a uniform coating layer, and thus, the coverage is improved. Specifically, when the value of cos θ is 0.5 or more (θ is 60° or less), the wettability is considered good.

TABLE 1

| | | Li | Element M | | Li/M | Water | Additive | | | | |
| | | | | | | | | | Number of | Moles of ethylene | Addition |
| | Precursor solution | Content (mass %) | Type | Content (mass %) | (molar ratio) | content (mass %) | | Type | carbon atoms | oxide added | amount (mass %) |
|---|---|---|---|---|---|---|---|---|---|---|---|
| Comp. Ex. 1 | Lithium niobate | 0.53 | Nb | 5.55 | 1.28 | 88 | None | — | — | — | — |
| Ex. 1 | Lithium niobate | 0.53 | Nb | 5.49 | 1.29 | 88 | 1,2-propanedial | Alcohol | 3 | — | 1.0 |
| Ex. 2 | Lithium niobate | 0.48 | Nb | 5.00 | 1.29 | 80 | 1,2-propanedial | Alcohol | 3 | — | 10.0 |
| Ex. 3 | Lithium niobate | 0.53 | Nb | 5.49 | 1.29 | 88 | 1-butanole | Alcohol | 4 | — | 1.0 |
| Ex. 4 | Lithium niobate | 0.53 | Nb | 5.54 | 1.28 | 88 | Furgent 222F | Nonionic surfactant | — | 22 | 0.1 |
| Ex. 5 | Lithium niobate | 0.53 | Nb | 5.49 | 1.29 | 88 | Furgent 222F | Nonionic surfactant | — | 22 | 1.0 |
| Ex. 6 | Lithium niobate | 0.53 | Nb | 5.49 | 1.29 | 88 | LEOCOL TD-120 | Nonionic surfactant | — | 12 | 1.0 |
| Ex. 7 | Lithium niobate | 0.53 | Nb | 5.49 | 1.29 | 88 | DEDG | Nonionic surfactant | — | 2 | 1.0 |
| Comp. Ex. 2 | Lithium niobate | 0.16 | Nb | 2.44 | 0.88 | 90 | EMULGEN 108 | Nonionic surfactant | — | 6 | 0.35 |
| Comp. Ex. 3 | Lithium phosphate | 0.39 | P | 1.63 | 1.07 | 90 | None | — | — | — | — |
| Ex. 8 | Lithium phosphate | 0.39 | P | 1.61 | 1.08 | 89 | EMULGEN 108 | Nonionic surfactant | — | 6 | 1.0 |

TABLE 2

| | | Surface energy | | | LNCM(111) | | LNM(13) | LNCM(811) | Coverage |
|---|---|---|---|---|---|---|---|---|---|
| | | | Dispersive component | Polar component | Contact angle | | Contact angle | Contact angle | Relative value |
| | Absorbance | (mN/m) | (mN/m) | (mN/m) | (deg) | (cosθ) | (deg) | (deg) | (%) |
| Comp. Ex. 1 | 0.009 | 72.7 | 23.3 | 49.4 | 66.1 | 0.4 | 62.7 | 57.8 | Reference Value |
| Ex. 1 | 0.010 | 70.9 | 13.8 | 57.1 | 57.8 | 0.5 | 55.1 | 55.6 | +5 |
| Ex. 2 | 0.009 | 60.7 | 18.7 | 42.0 | 57.5 | 0.5 | 53.4 | 50.9 | +10 |
| Ex. 3 | 0.003 | 58.7 | 11.4 | 47.3 | 43.1 | 0.7 | 51.6 | 47.8 | +5 |
| Ex. 4 | 0.039 | 22.4 | 7.9 | 14.5 | 44.2 | 0.7 | 43.0 | 45.4 | +11 |
| Ex. 5 | 0.053 | 22.6 | 8.3 | 14.3 | 40.8 | 0.8 | 40.3 | 40.7 | +13 |
| Ex. 6 | 0.013 | 29.5 | 23.9 | 5.6 | 26.3 | 0.9 | 28.7 | 30.9 | +13 |
| Ex. 7 | 0.010 | 54.8 | 14.5 | 40.3 | 54.8 | 0.6 | 47.2 | 47.8 | +8 |
| Comp. Ex. 2 | 3.331 | 27.6 | 23.7 | 3.9 | 22.3 | 0.9 | 25.1 | 20.0 | Not measured |
| Comp. Ex. 3 | 0.000 | 75.8 | 22.9 | 52.9 | 61.6 | 0.5 | 60.2 | 70.6 | Reference value |
| Ex. 8 | 0.024 | 27.5 | 24.8 | 2.7 | 24.7 | 0.9 | 25.4 | 25.3 | +6 |

What is claimed is:

1. A lithium-containing oxide precursor solution for forming a coating layer on powder of an electrode active material, comprising:

Li in an amount of 0.1 mass % or more and 5.0 mass % or less;

at least one element M selected from Nb, F, Fe, P, Ta, V, Ge, B, Al, Ti, Si, W, Zr, Mo, S, Cl, Br, and I in an amount of 0.05 mass % or more and 35 mass % or less; and water in an amount of 60 mass % or more and 98.4 mass % or less, wherein a value of absorbance at a wavelength of 660 nm is 0.1 or less, a value of surface energy is 72 mN/m or less, the Li and the at least one of the M elements are dissolved in a solvent, and the at least one element M includes P in an amount such that the lithium-containing oxide precursor solution has a value of a molar ratio Li/P between the Li and the P of 0.90 or more and 1.40 or less.

2. The lithium-containing oxide precursor solution for forming a coating layer on powder of an electrode active material according to claim 1, wherein a value of a polar component of the surface energy is 0 mN/m or more and 45 mN/m or less.

3. The lithium-containing oxide precursor solution for forming a coating layer on powder of an electrode active material according to claim 1, wherein the value of the surface energy is 15 mN/m or more and 40 mN/m or less.

4. The lithium-containing oxide precursor solution for forming a coating layer on powder of an electrode active material according to claim 1, which contains a surfactant in an amount of 0.01 mass % or more and 20.0 mass % or less.

5. The lithium-containing oxide precursor solution for forming a coating layer on powder of an electrode active material according to claim 4, wherein the surfactant is a nonionic surfactant.

6. A method for producing the lithium-containing oxide precursor solution for forming a coating layer on powder of an electrode active material according to claim 1, the method comprising:

dissolving the lithium and the at least one element selected from Nb, F, Fe, P, Ta, V, Ge, B, Al, Ti, Si, W, Zr, Mo, S, Cl, Br, and I in a solvent comprising water to be included in the lithium-containing oxide precursor solution for forming a coating layer on powder of an electrode active material with the proviso that the at least one element includes P in an amount such that a value of a molar ratio Li/P between the lithium and the P is 0.90 or more and 1.40 or less; and adjusting a value of surface energy of the solvent to be included in the lithium-containing oxide precursor solution for forming a coating layer of powder of an electrode active material to 72 mN/m or less, wherein the dissolving and the surface energy adjusting are performed in any order.

7. The method for producing a lithium-containing oxide precursor solution for forming a coating layer on powder of an electrode active material according to claim 6, wherein a value of a polar component of the surface energy is adjusted to 0 mN/m or more and 45 mN/m or less in the surface energy adjusting.

8. The method for producing a lithium-containing oxide precursor solution for forming a coating layer on powder of an electrode active material according to claim 6, wherein the value of the surface energy is adjusted by adding a surfactant.

9. The method for producing a lithium-containing oxide precursor solution for forming a coating layer on powder of an electrode active material according to claim 8, wherein the surfactant is a nonionic surfactant.

10. A method for producing a lithium-containing oxide precursor solution for forming a coating layer on powder of an electrode active material according to claim 1, the method comprising:

dissolving the lithium and the at least one element selected from Nb, F, Fe, P, Ta, V, Ge, B, Al, Ti, Si, W, Zr, Mo, S, Cl, Br, and I in a solvent comprising water to be included in the lithium-containing oxide precursor solution for forming a coating layer on powder of an electrode active material with the proviso that the at least one element includes P in an amount such that a value of a molar ratio Li/P between the lithium and the P is 0.90 or more and 1.40 or less;

adjusting a value of surface energy of the solvent to be included in the lithium-containing oxide precursor solution for forming a coating layer on powder of an electrode active material to 72 mN/m or less; and filtering a solution obtained through the dissolving, wherein the dissolving and the surface energy adjusting are performed in any order.

5

* * * * *